(12) United States Patent
Lemmon et al.

(10) Patent No.: US 9,179,640 B2
(45) Date of Patent: Nov. 10, 2015

(54) INDIVIDUAL ROOM DUCT AND VENTILATION SYSTEM FOR LIVESTOCK PRODUCTION BUILDING

(71) Applicant: WHITESHIRE/HAMROC LLC, Albion, IN (US)

(72) Inventors: Michael E. Lemmon, Kendallville, IN (US); Charles M. Lemmon, Albion, IN (US)

(73) Assignee: Whiteshire/Hamroc LLC, Albion, IN (US)

( * ) Notice: Subject to any disclaimer, the term of this patent is extended or adjusted under 35 U.S.C. 154(b) by 0 days.

(21) Appl. No.: 14/057,647

(22) Filed: Oct. 18, 2013

(65) Prior Publication Data

US 2014/0057548 A1   Feb. 27, 2014

Related U.S. Application Data

(62) Division of application No. 12/646,446, filed on Dec. 23, 2009, now Pat. No. 8,635,974.

(51) Int. Cl.
*A01K 1/00* (2006.01)
*F24F 7/06* (2006.01)
(Continued)

(52) U.S. Cl.
CPC ............ *A01K 1/0052* (2013.01); *A01K 1/0047* (2013.01); *F24F 7/06* (2013.01); *F24F 7/08* (2013.01); *F24F 11/0001* (2013.01); *F24F 11/0012* (2013.01); *F24F 11/0076* (2013.01); *F24F 11/02* (2013.01); *F24F 13/02* (2013.01)

(58) Field of Classification Search
CPC ..... A01K 1/00; A01K 1/0047; A01K 1/0052; A01K 1/0058; A01K 1/0064; A01K 1/0103; A01K 1/01; A01K 31/22; A01K 31/18; A01K 1/02; B65D 5/4295; F24F 7/00; F24F 7/04; F24F 7/10; F24F 2007/003; F24F 7/06
USPC ............... 119/436, 437, 444, 448, 493, 500; 168/20, 19, 18, 2, 1, 3, 17; 454/237, 454/239, 241, 243, 244, 251, 252, 253, 238, 454/255, 256
See application file for complete search history.

(56) References Cited

U.S. PATENT DOCUMENTS

| RE3,317 E | 3/1869 | Roberts |
|---|---|---|
| 1,651,539 A | 12/1927 | Olson |

(Continued)

FOREIGN PATENT DOCUMENTS

| CN | 86103719 A | 12/1986 |
|---|---|---|
| CN | 1496674 A | 10/2003 |

(Continued)

OTHER PUBLICATIONS

Restriction Requirement mailed Mar. 16, 2012 in related U.S. Appl. No. 12/646,446.

(Continued)

*Primary Examiner* — Trinh Nguyen
(74) *Attorney, Agent, or Firm* — Faegre Baker Daniels LLP

(57) ABSTRACT

A livestock production building includes an automatically controllable ventilation system which provides ventilation to livestock containment rooms. Incoming air may be heated, cooled and/or filtered, and is mixed and tempered before being delivered to livestock rooms. Substantially all exhaust air is filtered to mitigate environmental impact.

29 Claims, 16 Drawing Sheets

(51) Int. Cl.
  *F24F 11/00* (2006.01)
  *F24F 11/02* (2006.01)
  *F24F 13/02* (2006.01)
  *F24F 7/08* (2006.01)

(56) References Cited

U.S. PATENT DOCUMENTS

| | | | |
|---|---|---|---|
| 1,979,804 | A | 11/1934 | Lutz |
| 2,639,655 | A | 5/1953 | Whitehead |
| 3,677,229 | A | 7/1972 | Blough |
| 3,786,171 | A | 1/1974 | Shira |
| 3,835,606 | A | 9/1974 | Liberman |
| 3,938,428 | A | 2/1976 | Van Huis |
| 4,249,461 | A | 2/1981 | Christenson et al. |
| 4,286,630 | A | 9/1981 | Happer |
| 4,292,927 | A | 10/1981 | Sassman |
| 4,314,527 | A | 2/1982 | Shaw |
| 4,334,577 | A | 6/1982 | George |
| 4,382,401 | A | 5/1983 | Simmler |
| 4,426,918 | A | 1/1984 | Lambert |
| 5,036,797 | A | 8/1991 | Koozer |
| 5,145,460 | A | 9/1992 | Smith, Jr. |
| 5,492,082 | A | 2/1996 | Krevinghaus et al. |
| 5,666,905 | A | 9/1997 | Mackin et al. |
| 6,052,959 | A | 4/2000 | LaBrosse |
| 6,321,687 | B1 | 11/2001 | Lemmon et al. |
| 6,491,580 | B2 | 12/2002 | Lemmon et al. |
| 7,350,364 | B2 | 4/2008 | Meerpohl |
| 8,490,579 | B2 | 7/2013 | Pow et al. |
| 2011/0146582 | A1 | 6/2011 | Lemmon et al. |

FOREIGN PATENT DOCUMENTS

| | | |
|---|---|---|
| CN | 2812565 Y | 9/2006 |
| CN | 101534634 A | 9/2009 |
| CN | 101004278 B | 10/2010 |
| DE | 2555199A1 A1 | 6/1977 |
| DE | 3413582 A1 | 10/1985 |
| EP | 0294909 A1 | 12/1988 |
| EP | 1035386 A2 | 9/2000 |
| FR | 2515319 A1 | 4/1983 |
| SU | 1322028 A1 | 7/1987 |
| UA | 37853 U | 12/2008 |
| WO | W08607438 A1 | 12/1986 |
| WO | W02009079722 A1 | 9/2009 |

OTHER PUBLICATIONS

Election filed Apr. 16, 2012 in related U.S. Appl. No. 12/646,446.
Office Action mailed Aug. 9, 2012 in related U.S. Appl. No. 12/646,446.
Amendment filed Nov. 9, 2012 in related U.S. Appl. No. 12/646,446.
Office Action mailed Sep. 19, 2012 in related Chinese application No. 201010625194.6.
Office Action mailed May 2, 2013 in related Chinese application No. 201010625194.6.
Chinese Office Action mailed Jan. 6, 2015 including the Chinese Search Report dated Dec. 19, 2014 of related Chinese Application No. 2013106456634.

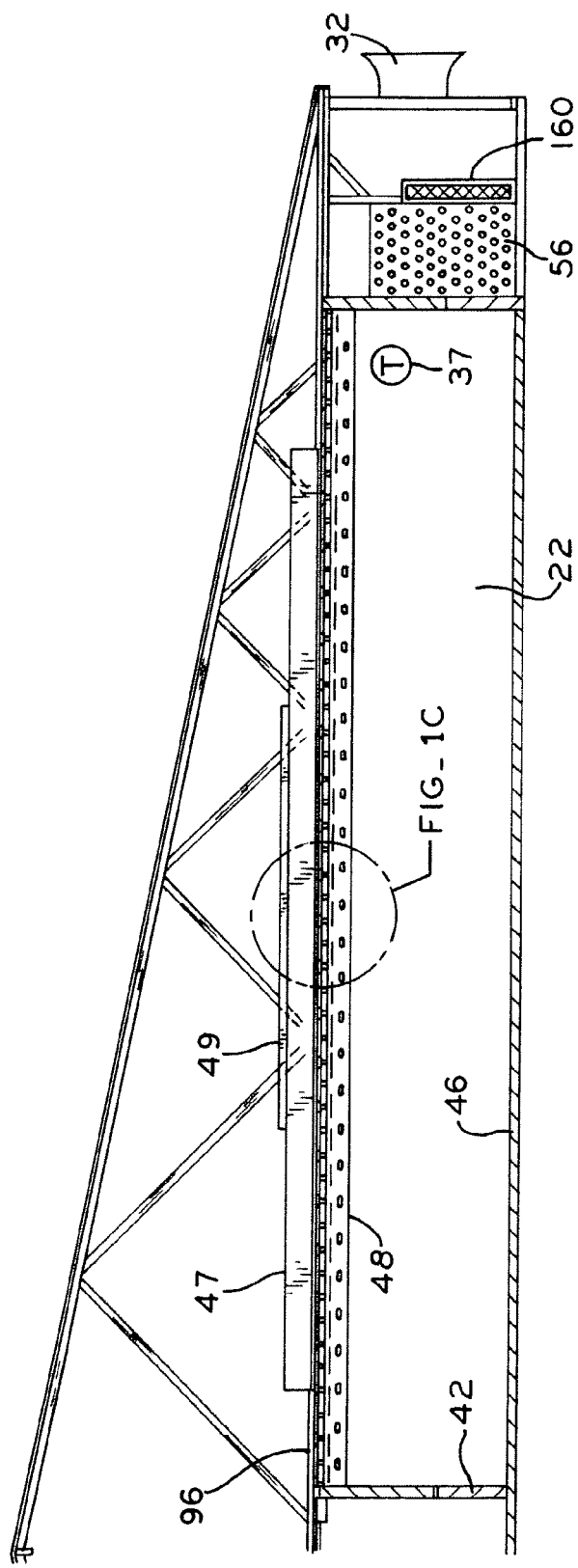
FIG._1B

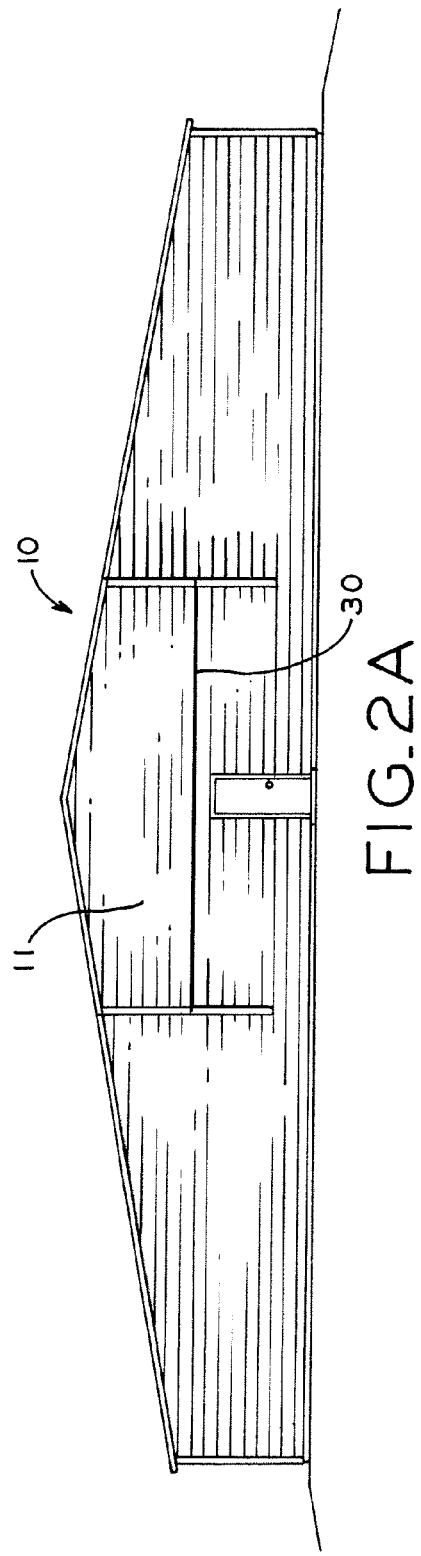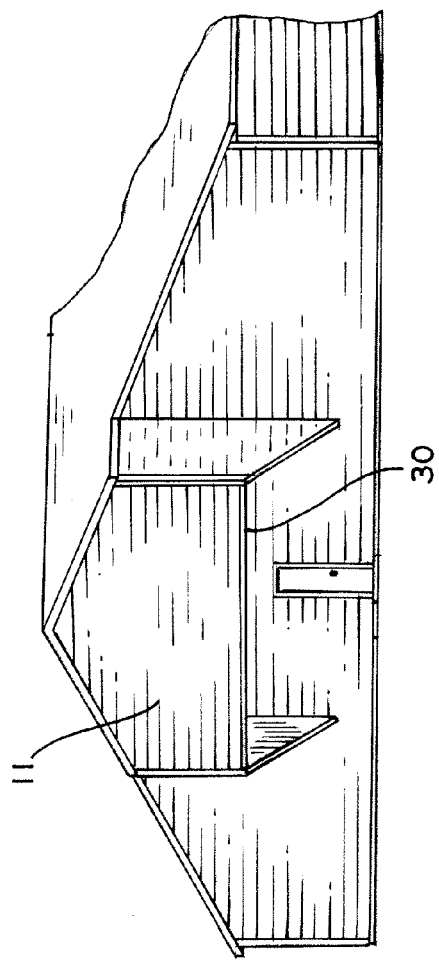

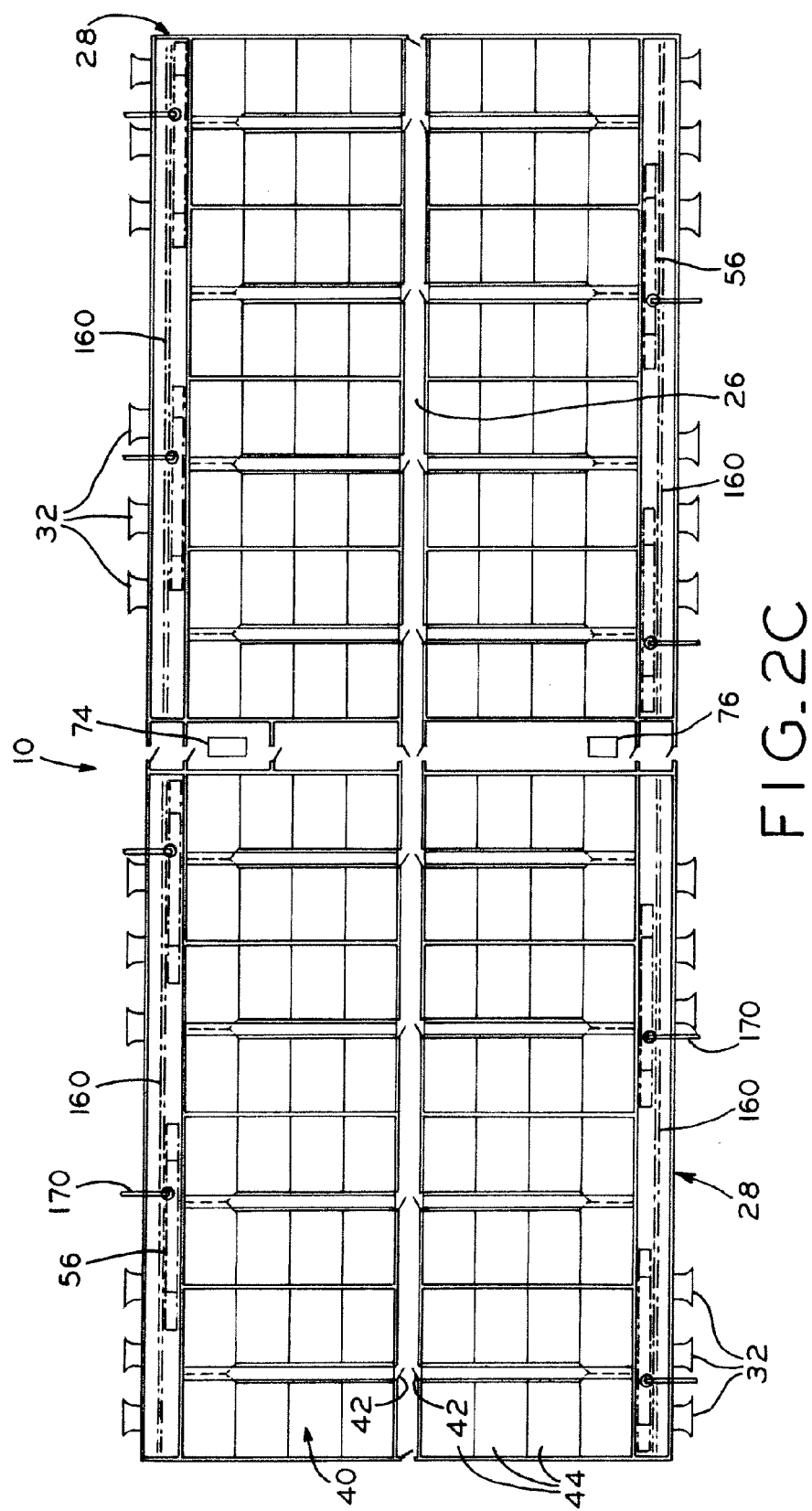

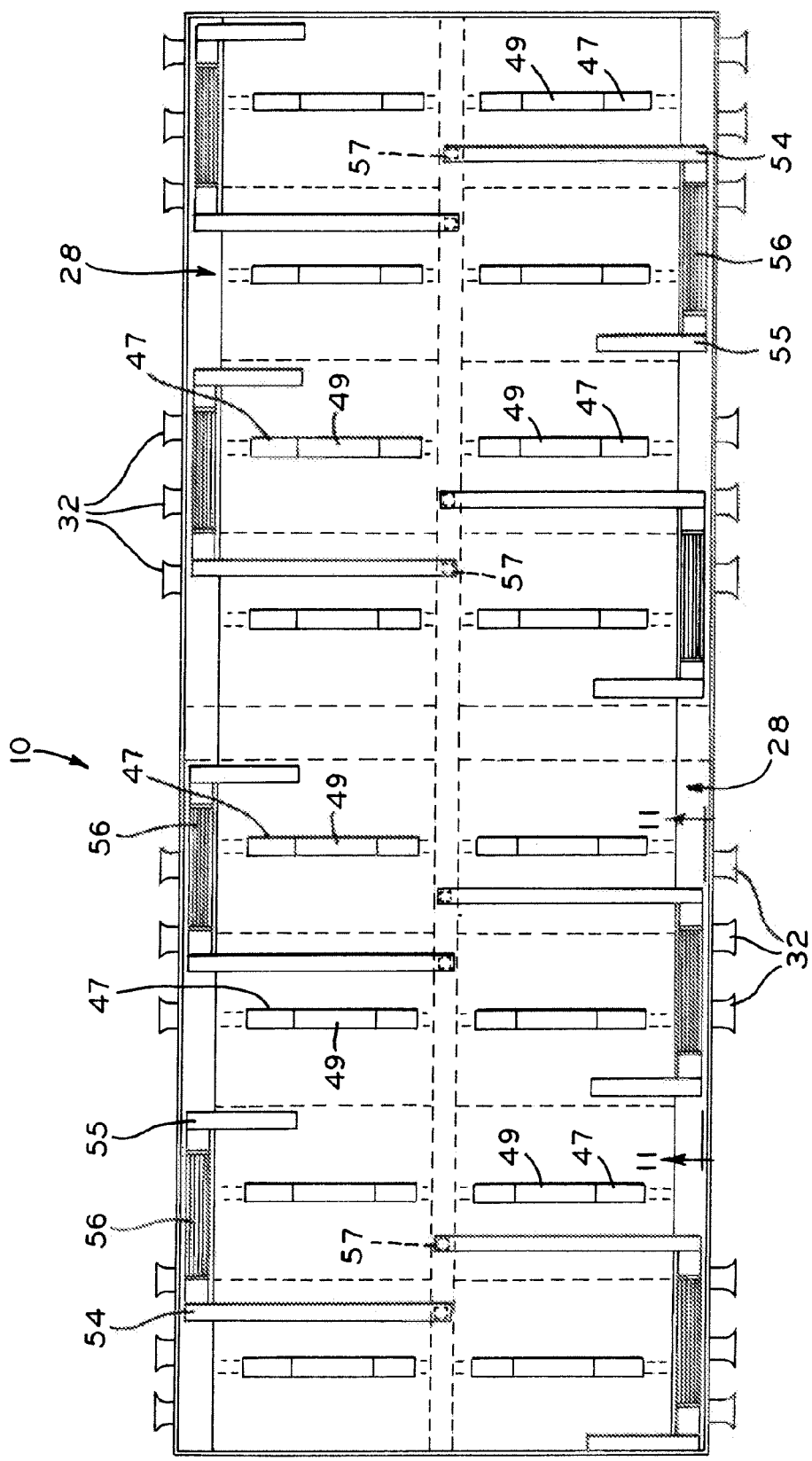
FIG._2D

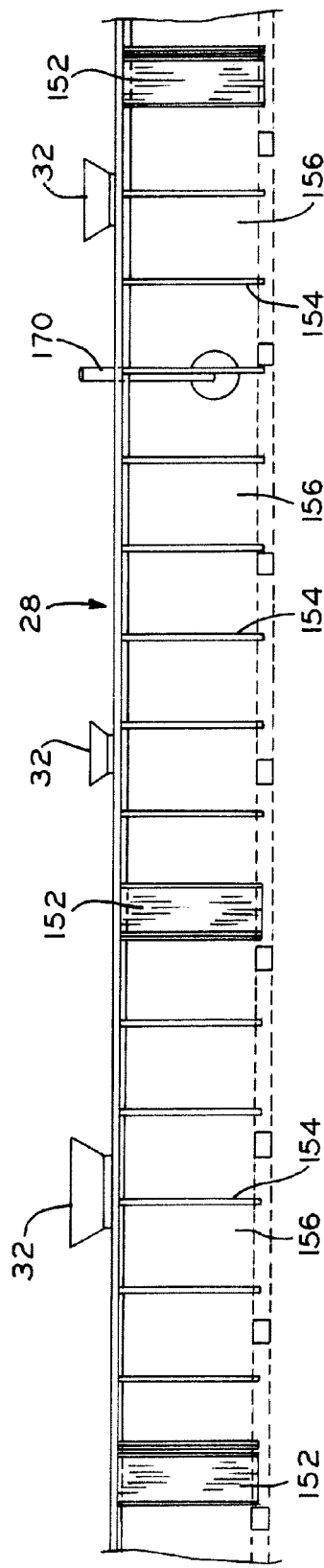
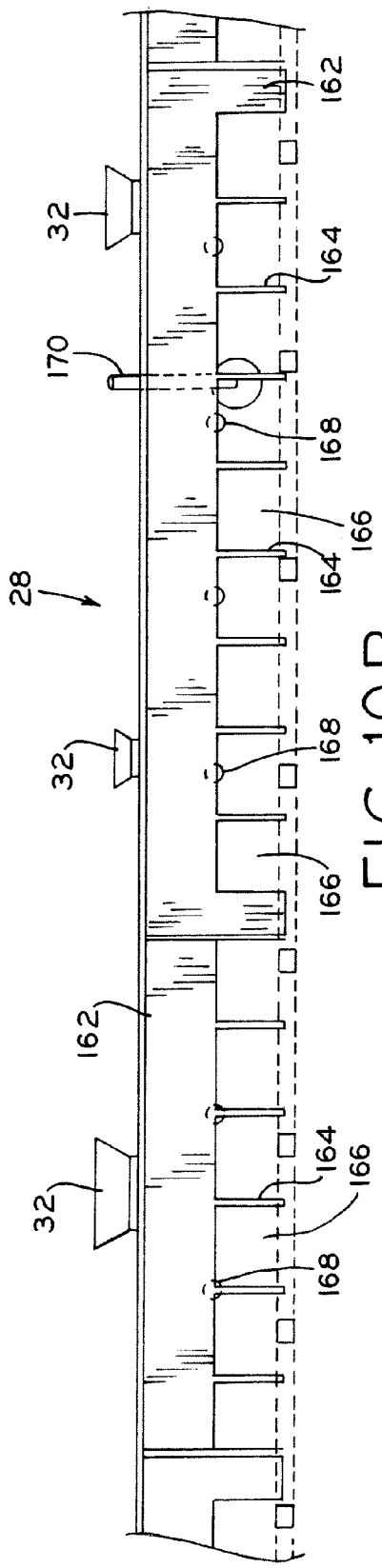

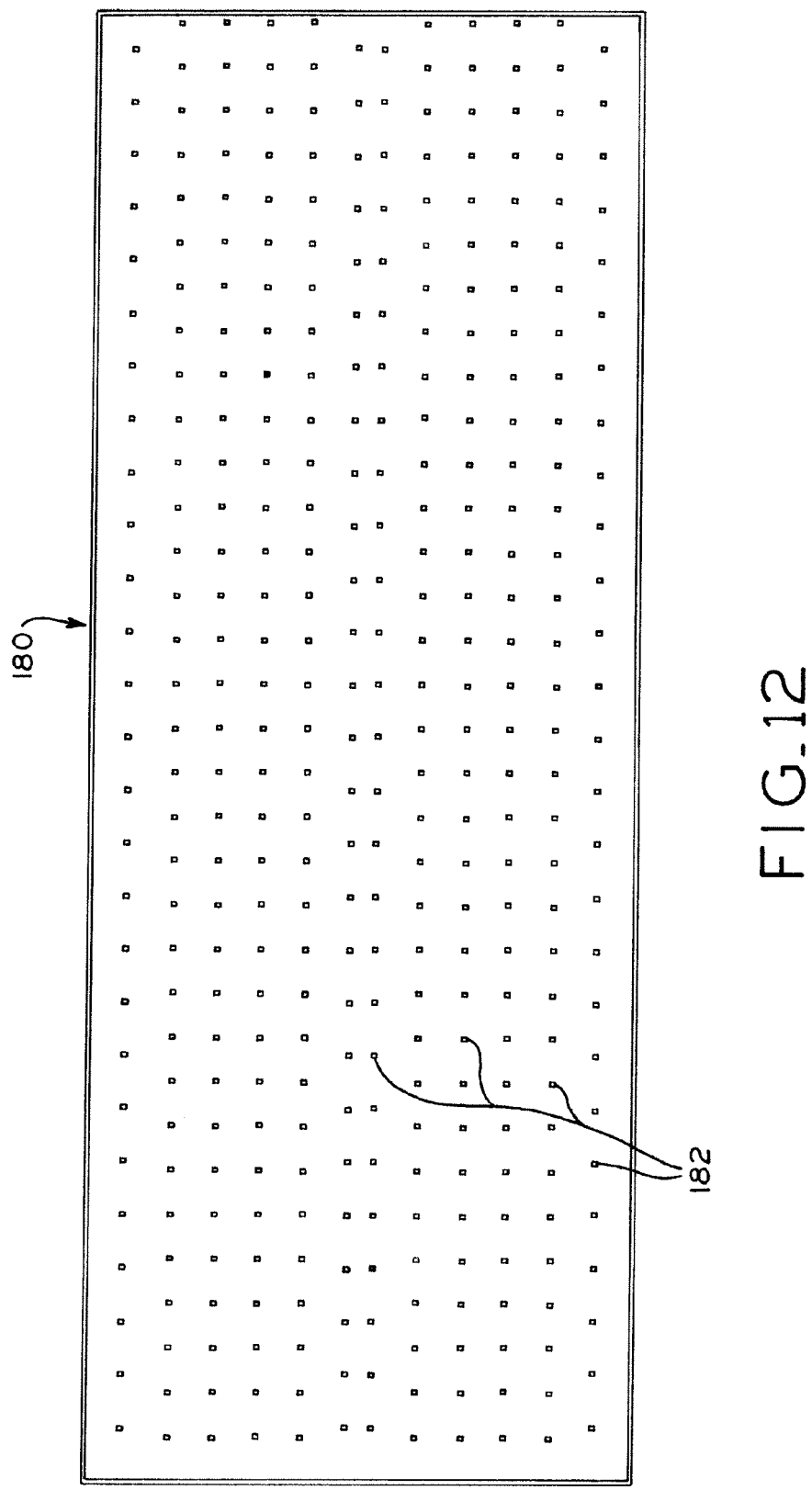
FIG_12

INDIVIDUAL ROOM DUCT AND VENTILATION SYSTEM FOR LIVESTOCK PRODUCTION BUILDING

CROSS REFERENCE TO RELATED APPLICATIONS

This application is a Divisional of U.S. patent application Ser. No. 12/646,446 filed Dec. 23, 2009, the entire disclosure of which is hereby explicitly incorporated by reference herein.

BACKGROUND

1. Technical Field

This disclosure relates to livestock production buildings and more particularly deals with production building ventilation and temperature control systems.

2. Background Art

The optimum feeding and finishing conditions for livestock, and particularly hogs and pigs, are a function of the total environment in which they live. Therefore, proper temperature and ventilation control are important to their growth, health and welfare. These same conditions are necessary to provide a comfortable and healthy working environment for the animal caretakers.

Additionally, it is important to provide cooling air to reduce or prevent temperature stress on the livestock. However, it is also important to avoid dramatic temperature changes which may in itself cause temperature shock or stress to the livestock. Therefore, as well as controlling the rate, velocity and direction it is important to facilitate the tempering of cooler intake air before it comes into contact with the livestock. During periods of hot weather, the combination of air temperature and the heat produced by the livestock requires a substantial volume of cooling air. The optimal ambient condition depends on the number, type and age of the livestock in the building; for example, younger and smaller pigs require less cooling air because they put off less body heat and are not as closely confined.

Little cooling air is required during cold weather. Nevertheless minimal ventilation is still required to remove moisture and for the health of the livestock and the workers. Under cold weather conditions a minimum fresh air supply is required but the temperature of the fresh air must be controlled to prevent temperature shock to the livestock. This fresh air must also be evenly distributed throughout the pig space.

Moreover, if the environment in which animals are raised has favorable conditions, such as temperature and ventilation, the amount of feed necessary to produce livestock yielding a given amount of meat is reduced and efficiency of the livestock production operation is increased.

Current livestock ventilation apparatus have many inadequacies primarily due to the fact that ventilation apparatus merely draw a ventilating air flow through the buildings. Such apparatus failed to properly control the air flow velocity, rate and distribution of the incoming fresh air.

One known prior art apparatus discloses an animal production building with pit ventilation through a slatted floor using both intake and exhaust fan. Air is accumulated in the attic and is pushed and pulled through the ceiling past the animals into the pit.

Another known prior art apparatus discloses a livestock consignment house having a slatted floor, a disposal pit, and a reversible fan in the roof such that air may be pushed or pulled past the animals through the pit.

One problem with existing livestock production buildings relates to the environmental impact of the exhaust air. This air may be subject to environmental regulations aimed at preserving or improving local air quality in the vicinity of livestock production facilities.

Another problem of the current livestock production buildings is the potential for contamination of the incoming air. This contamination may introduce pathogens to, and/or promote sickness in, the livestock population housed in the building.

One problem with the existing livestock production buildings relates to the conditioning of the intake air. For example, the blending and mixing of intake air may fail to provide a constant temperature range or may blend stale air with incoming fresh air.

Another problem of the current livestock production buildings is the loss of building heat with the exhaust air during cold weather.

SUMMARY

A livestock production building includes an automatically controllable ventilation system which provides ventilation to livestock containment rooms. Incoming air may be heated, cooled and/or filtered, and is mixed and tempered before being delivered to livestock rooms. Substantially all exhaust air is filtered to mitigate environmental impact.

In one embodiment, a duct system for providing air distribution from a fresh air supply to a room includes a ventilation duct, a plurality of ventilation slides disposed within the duct between the fresh air supply and the room, an actuator coupled to the plurality of ventilation slides, an actuator driver in a force-transmitting relationship with the actuator, a sensor positioned proximate the room with a signal output relating to an ambient condition proximate the sensor, and a controller including a comparator comparing the output signal to a value. The actuator is moveable between a closed position in which the ventilation slides impede movement of air between the fresh air supply and the room, and at least one open position in which the ventilation slides permit movement of air between the fresh air supply and the room. The controller activates the actuator driver to move the actuator when the comparator is in a predetermined state.

In one aspect, the controller activates the actuator for a predetermined period of time when the comparator is in the predetermined state, and the controller deactivates the actuator for dwell time after the predetermined period of time has elapsed.

In another aspect, the sensor is a temperature sensor. The controller has an upper temperature limit and a lower temperature limit, and the comparator compares the upper temperature limit and the lower temperature limit with the signal. The predetermined state is when an ambient temperature is one of i) lower than the lower temperature limit and ii) higher than the upper temperature limit.

In another aspect, the actuator opens the ventilation slides when the ambient temperature is lower than the lower limit and closes the ventilation slides when the ambient temperature is higher than the limit.

In yet another aspect, the actuator closes the ventilation slides when the ambient temperature is lower than the lower limit and opens the ventilation slides when the ambient temperature is higher than the upper temperature limit.

In still another aspect, the lower temperature limit is 0.5-degrees F. below a predetermined temperature and the upper temperature limits is 0.5-degrees F. above the predetermined temperature.

In another aspect, the actuator may be a fiberglass rod.

In another aspect, the duct system also includes a limit switch, the limit switch positioned to prevent further opening of the ventilation slides when the ventilation slides are in the at least one open position.

In another aspect, the ventilation duct may include an upper air passage and a lower air passage.

In another aspect, the ventilation duct may be spaced away from a ceiling of the room to form a gap in fluid communication with the upper air passage.

In another aspect, the ventilation duct may be disposed at the center of the room.

In another embodiment, a livestock production building has walls and a ceiling, and includes a containment room for livestock and an attic above the containment room. The attic includes a vent and a fresh air intake in fluid communication with ambient air outside the building. The building further includes a ventilation duct coupled to the vent, the ventilation duct in fluid communication with the attic and the containment room, and a ventilation house in fluid communication with the containment room, and coupled to the wall of the building. The ventilation house has an exhaust fan disposed between the containment room and ambient air outside the building, and a first filtering element disposed between the exhaust fan and the containment room, wherein air exhausted by the exhaust fan is filtered by the filtering element.

In one aspect, the first filtering element is generally vertically oriented with respect to a floor of the ventilation house. The first filtering element may also be generally horizontally oriented with respect to a floor of the ventilation house.

In another aspect, a heat exchanger is disposed between the exhaust fan and the containment room.

In another aspect, the first filtering element is disposed between the heat exchanger and the exhaust fan. A second filtering element may also be disposed between the attic and the ventilation duct.

In another aspect, the fresh air intake comprises at least one opening located in the wall of the building adjacent the ventilation house.

In another aspect, the livestock production building may include cooling means disposed between the ambient outside air and the fresh air intake.

In still another aspect, a ventilation manifold may be disposed between the first filtering element and the containment room.

BRIEF DESCRIPTION OF THE DRAWINGS

The above mentioned and other features and objects of this disclosure, and the manner of attaining them, will become more apparent and will be better understood by reference to the following description of the embodiments of the invention taken in conjunction with the accompanying drawings, wherein:

FIG. 1B is a partial sectional end view of the building of FIG. 1A, illustrating an air duct;

FIG. 2A is an elevation view of the livestock production building of FIG. 1A, illustrating inlet vents;

FIG. 2B is a perspective view of the livestock production building of FIG. 2A, illustrating inlet vents;

FIG. 2C is a top plan sectional view of the livestock production building of FIG. 1, illustrating containment rooms;

FIG. 2D is a top plan sectional view of the livestock production building of FIG. 1, illustrating ducts and heat exchangers;

FIG. 9C is a plan view of the ventilation house of FIG. 9A, illustrating support members and spaces therebetween;

FIG. 10B is a plan view of the ventilation house of FIG. 10A, illustrating support members and spaces therebetween;

FIG. 12 is a plan view of a livestock production building foundation in accordance with the present disclosure.

Figure 1A:
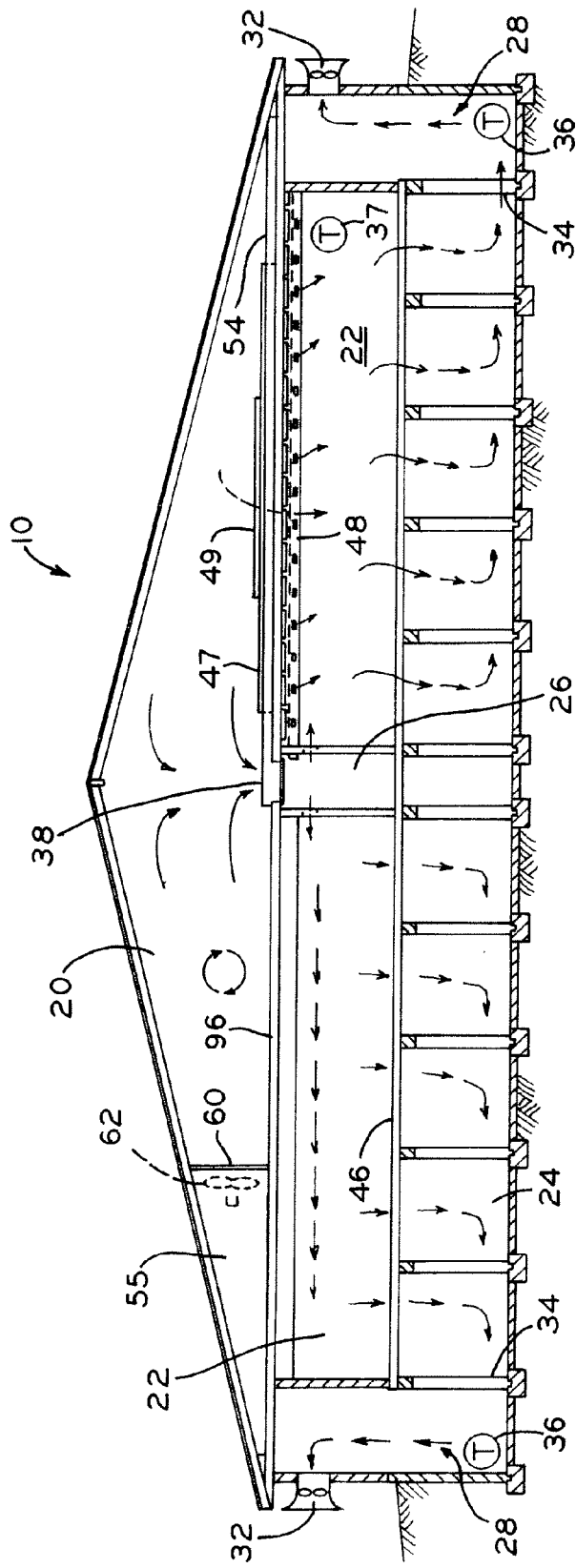
FIG. 1A is a sectional end view of a inventive livestock production building in accordance with the present disclosure, illustrating the air flow in warm weather.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DETAILED DESCRIPTION

The embodiments described herein are not intended to limit the scope of the invention to the precise form disclosed. Rather the embodiments have been chosen and described to explain the principles of the invention and its applications and practical use to best enable others skilled in the art to follow its teachings.

Referring first to FIG. 1A, a livestock production building generally indicated by reference numeral 10 is shown illustrating the air flow pattern therethrough during warm weather. Livestock production building 10 includes attic 20, containment area or space 22, pit 24, manifold area 26, and ventilation house 28. As best seen in FIGS. 2A and 2B, attic 20 includes fresh air inlet vents 30 positioned underneath overhangs 11 at each end of building 10. A foundation 180 (FIG. 12) includes a plurality of support beams 182, such as masonry block columns on 12-foot centers, to support ventilation houses 28, pit 24 and associated structures.

Ventilation house 28 includes exhaust fans 32, pit opening 34, and pit temperature sensor 36. Pit temperature sensor 36 is located proximal pit opening 34 in ventilation house 28 for adaptive control of the exhaust 156 air temperature. Containment area sensor 37 is located in containment area 22 for adaptive control of the amount of air flowing from attic 20 into rooms 40, as described in detail below.

Air passing into, through and out of building 10 may be conditioned to provide a variety of benefits. For example, building 10 may include various filtering elements, such as filters for incoming fresh air to minimize any introduction of potentially harmful viruses or bacteria within building 10, and/or filters for exhausting air to minimize environmental impact and ensure regulatory compliance. Air in building 10 may be also temperature conditioned before passing in to containment area 22, such as through a heat exchanger (discussed in detail below) or an air conditioning or evaporative cooling unit (not shown). For cooling, the evaporative cooling unit may include evaporative cooling pads disposed between the ambient outside area around building 10 and attic 20, such as within inlet vents 30. The cooling pads have a water delivery system positioned to deliver water to the cooling pads upon receiving a signal from controller 74 and/or 76, as discussed below. Each of these conditioning parameters may be automatically controlled and monitored via a control system including a controller and a plurality of sensors.

1. Building Ventilation

The ventilation system of building 10 is configurable to a hot weather configuration and a cold weather configuration. The cold weather configuration is discussed below. In the hot weather configuration, such as for temperatures in the range of 60 to 105 degrees F., fresh air is drawn through inlet vents 30 into attic 20 where some mixing and tempering are accomplished. Inlet vents 30 are located at a downwardly facing opening formed at the bottom of an overhang portion 11 extending outwardly away from the wall of building 10 (FIGS. 2A and 2B). In the illustrated embodiment, inlet vent 30 is disposed at a generally central location on the wall of building 10 and extends across approximately ⅓ of the width of building 10, but it is contemplated that inlet vent 30 may be smaller or larger, or may offset from the center of building 10 as required or desired for a particular application. Screen or wire mesh material is disposed at inlet vents 30 between attic 20 and the ambient air around building 10. To draw air into attic 20 via vents 30, a plurality of exhaust fans 32 are provided (FIGS. 2C and 2D) which exhaust air from ventilation house 28, in turn creating a relatively low pressure within building 10 that draws air into attic 20 from the relatively higher pressure ambient surroundings.

Air passes from attic 20 into containment area 22 either directly through filtering air duct 48, or indirectly through manifold area 26, as described in detail below. Additional mixing, tempering and filtering of the air may be accomplished before introduction into containment area 22. Once introduced into containment area 22, the air provides climate control and ventilation for livestock (not shown) residing in containment area 22.

More specifically, containment area 22 includes a plurality of containment rooms 40 (FIG. 2C). Containment rooms 40 may include a plurality of pens 44 and door 42 leading to manifold area 26, such as for ingress and egress of livestock and for maintenance access. The air flows from containment rooms 40 through slatted floors 46 into pit 24, then through pit opening 34 into ventilation house 28. The air is exhausted from ventilation house 28 to the outside through exhaust fans 32. Controller 74 automatically controls exhaust fans 32, as discussed in detail below.

2. Multi-Passage Duct

Figure 4:
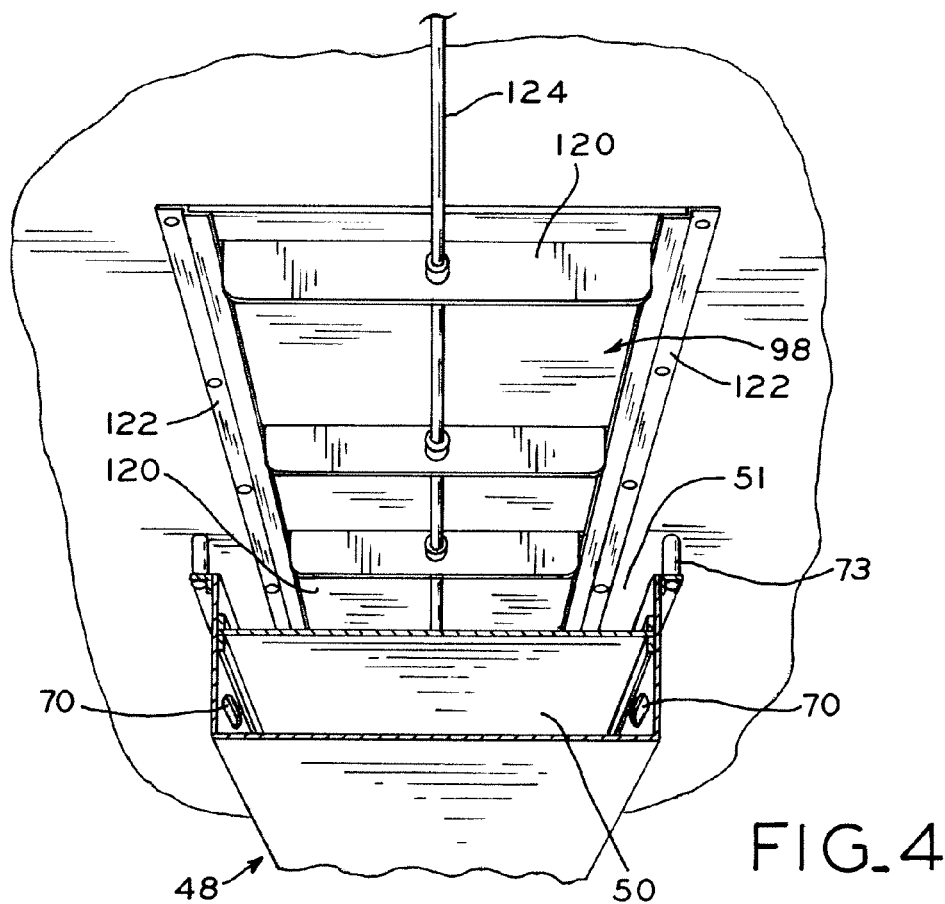
FIG. 4 is a perspective view of a portion of a containment room, illustrating an air duct and ventilation slides.

Each containment room 40 includes air duct 48 to evenly distribute the air over the livestock in room 40. As best shown in FIGS. 2D and 4, a set of containment rooms 40 includes a single air duct 48 that is generally centrally located on ceiling 96 and runs the length of room 40. The air flows into containment room 40 through air duct 48 and air is distributed over the livestock in containment room 40 before passing through slatted floor 46 (FIG. 1A) and being pulled out through pit 24 by exhaust fan 32.

Figure 3:
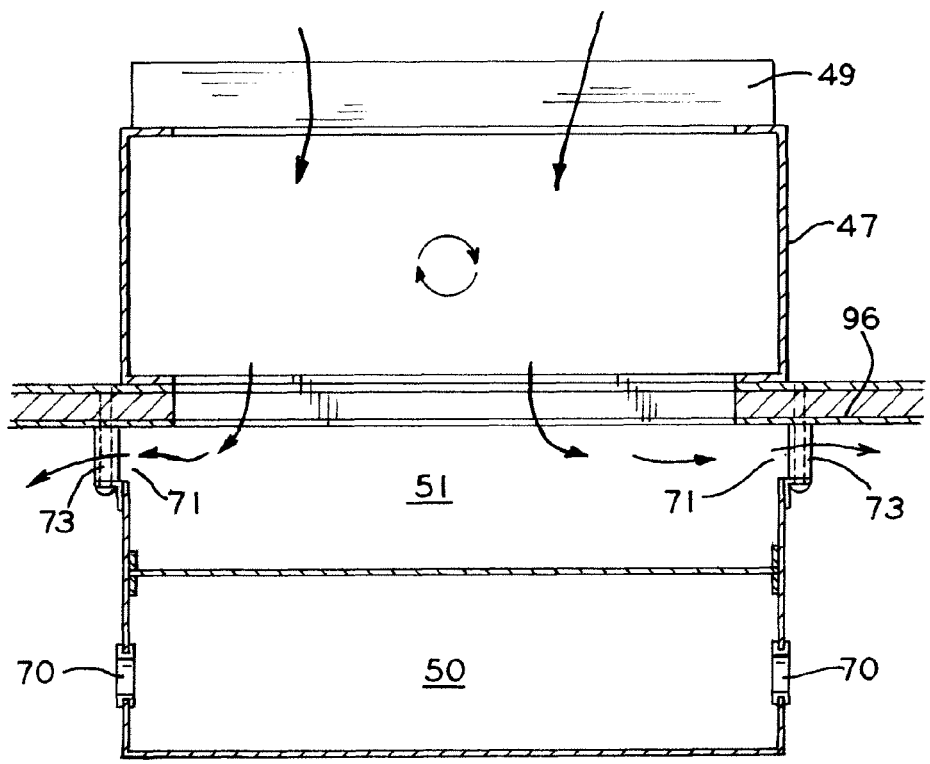
FIG. 3 is a section side elevation view of an air duct in accordance with the present disclosure.
Figure 6:
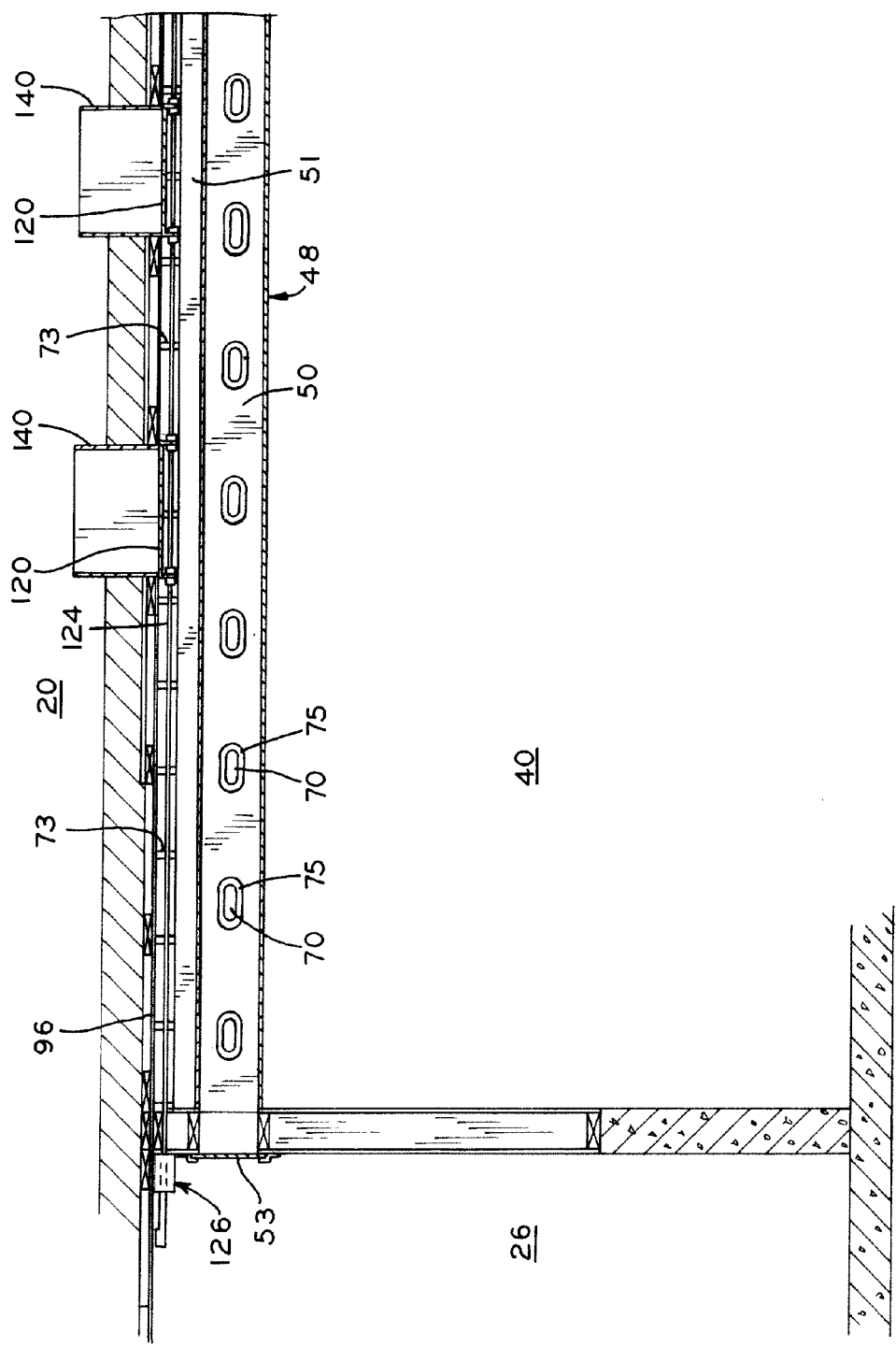
FIG. 6 is an elevation view of a portion of the containment room of FIG. 4, illustrating a ventilation slide actuator and insulation stops in relation to the air duct of FIG. 1B.

Referring now to FIGS. 3 and 4, air duct 48 includes a lower or first air passage 50 and an upper or second air passage 51. Lower air passage 50 is in fluid communication with manifold area 26, and includes a plurality of openings 70 to allow air to flow into room 40 from manifold area 26. Openings 70 are evenly distributed on lower air passage 50 to evenly distribute at least a minimum, or baseline, flow of air through room 40. Openings 70 are shown as generally oblong horizontal openings but may take other shapes or orientations due to the application or preferences. As the number of openings 70 increases, the maximum flow rate through lower portion 50 of duct 48 also increases. Optionally, as seen in FIG. 6, openings 70 each have an air opening collar 75 for added strength.

Air passage 51 is in fluid communication with attic 20 via a plurality of ventilation slides 120 (discussed below). Air passage 51 includes gap 71, the size of which may be changed by altering the length of spacers or standoffs 73. As the length of spacers 73 increases, the maximum flow rate of upper air passage 51 of duct 48 also increases. Upper air passage 51 is used to bring an additional flow of air from attic 20 to containment area 22, in addition to the minimum amount of ventilating air passing through lower air passage 50. The length of spacers 73 varies depending on the air flow needs of a particular room. For example, in a livestock finishing room where animals are generally larger and generate more heat, exemplary spacers 73 may be longer, such as approximately 3 inches long, to allow more cooling and ventilating air to flow over the larger animals. On the other hand, in a farrowing room where the animals are smaller and younger, and thus generate less heat, exemplary spacers 73 may be shorter, such as approximately 1.25 inches long, because less ventilation is required.

Moreover, when minimal air flow is required, only air passage 50 is utilized. As seen in FIG. 6, air passage 50 has sufficient openings 70 to allow uniform distribution of air in room 40 at low or medium air flow rates. When higher air flows are required, the other air passage 51 may be used by opening ventilation slides 120 to evenly distribute more air to room 40 via gap 71, as described in detail below.

The air flows evenly out of openings 70 and gap 71 because exhaust fan 32 keeps the air pressure in room 40 lower than the air pressure in the operating passages of air duct 48. The air at the higher pressure in air duct 48 flows evenly out of openings 70 and gap 71 over the livestock in room 40. Therefore, separate air passages allow the distribution of air uniformly under diverse environmental and building conditions.

Figure 5:
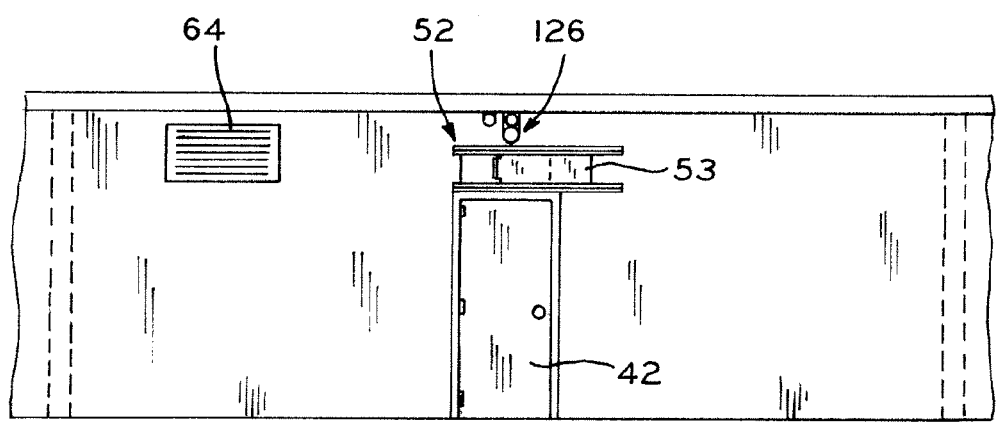
FIG. 5 is a side view of a containment room from the manifold area, with an air flow control valve panel shown partially open.
Figure 7:
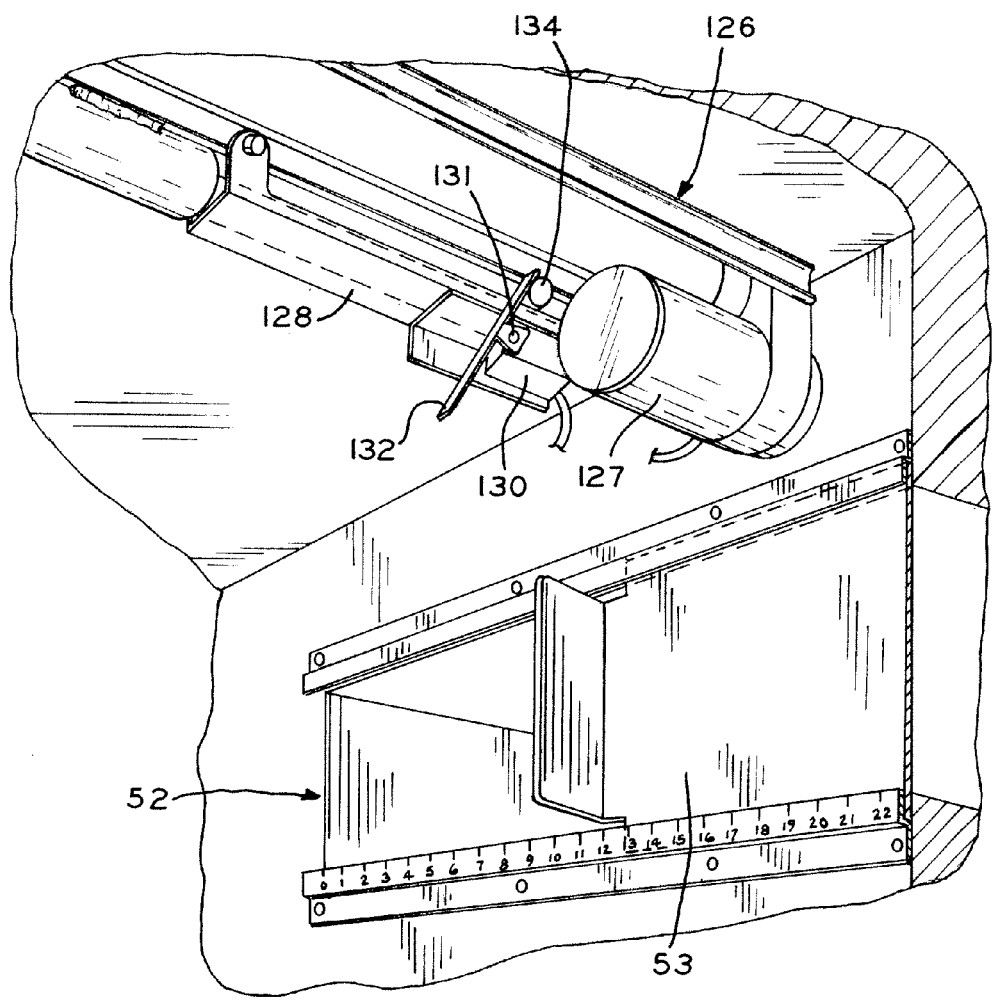
FIG. 7 is perspective view of the actuator of FIG. 6.

Airflow control valve 52 and ventilation slides 120 control the environment in room 40, such as to accommodate livestock of differing age, size, and type. Referring now to FIGS. 5 and 7, lower passage 50 of air duct 48 couples with airflow control valve 52 at the front wall of containment room 40. Airflow control valve 52 includes sliding panel 53 to control the airflow from manifold area 26 into passage 50 of air duct 48. In controlling the airflow into lower air passage 50, the air pressure in that passage is also controlled. When sliding panel 53 is completely closed allowing no airflow into the passage, the pressure in that passage is approximately that of the pressure in room 40 and no air flows from manifold area 26 into room 40 via passage 50. Conversely, when sliding panel 53 is completely open, the pressure in operating passage 50 is approximately the pressure in manifold area 26 and the maximum air flow for that air passage flows out of openings 70 into room 40. When sliding panel 50 is partially open, the pressure in air passage 50 is changed and the air flow out openings 70 ranges from zero to maximum.

Referring now to FIG. 5, ceiling 96 includes a plurality of apertures 98 with tracks 122 at two opposing sides of apertures 98. Ventilation slides 120 are slidingly received within tracks 122 to selectively interrupt or permit air flow through apertures 98 (and thus, from attic 20 into containment area 22 via upper air passage 51). In the illustrated embodiment, actuator rod 124 moves ventilation slides 120 between their respective opened and closed positions, as discussed in detail below. However, in one embodiment (not shown), ventilation slides 120 are also manually actuable.

Apertures 98 are sufficiently large to allow a high volume of air to pass into room 40 via gap 71. Thus, spacers 73 may set the maximum airflow through passage 51. That is to say, even if spacers 73 are relatively long and create a relatively large gap 71 capable of moving a large amount of air, apertures 98 may be opened to move even more air. Thus, apertures 98 may be sized such that they do not limit the maximum air flow that can travel through upper air passage 51 of duct 48.

However, the amount of air passing through apertures 98 is controlled by the position of ventilation slides 120. When ventilation slides 120 are completely closed, as shown in FIG. 4, airflow between attic 20 and room 40 via upper passage 51 of duct 48 is essentially zero. If ventilation slides 120 are in the fully open position, a first maximum air flow flows through gap 71 into room 40, with the first maximum flow generally set by the size of gap 71. When ventilation slides 120 are only partially open, the air flow through upper air passage 51 via gap 71 ranges from zero to a second maximum air flow that is generally set by the position of slides 120.

Referring now to FIGS. 6 and 7, ventilation slides 120 are driven by actuator rod 124, which in turn is driven by actuator 126 located in manifold area 26 (FIG. 6). Actuator 126 includes motor 127 and actuator guard 128, and may optionally include limit switch 130 (FIG. 7). Motor 127 is coupled with actuator rod 124 to drive actuator rod between open and closed positions. Motor 127 is operatively coupled with ventilation controller 76, which receives and processes signals from containment area temperature sensor 37 (as described in detail below).

Limit switch 130 may be used to place outer limits on the opening of ventilation slides 120. As motor 127 drives actuator rod 124 to open ventilation slides 120, actuator guard 128 also moves forward. A protuberance, such as a bolt or rod 134, may extend outwardly from actuator guard 128 to contact limit switch paddle 132 to activate limit switch 130. Upon activation, limit switch 130 prevents further motion of actuator rod 124. As best seen in FIG. 7, rod 134 moves together with the actuator rod 124. As actuator rod 134 moves backwards (i.e., further into manifold area 26), rod 134 urges paddle 132 if switch 130 to pivot about paddle axis 131. When moved pivoted sufficiently far, switch 130 is activated and prevents motor 127 from further opening ventilation slides 120. Thus, limit switch 130 operates to place a limit on how far ventilation slides 120 may be opened by actuator 126. Advantageously, limit switch 130 may be used to prevent over ventilation of a containment room 40 with smaller animals contained therein.

Optionally, air duct 48 may have more than two air passages with varying air flow potential in each passage. An exemplary multi-passage air duct is disclosed in U.S. Pat. No. 6,491,580 B2, filed Sep. 28, 2009 entitled INDIVIDUAL ROOM DUCT AND VENTILATION SYSTEM FOR LIVESTOCK PRODUCTION BUILDING, the disclosure of which is hereby incorporated by reference herein in its entirety. The overall size of air duct 48 may vary to accommodate variations in room size and ventilation requirements.

Optionally, air duct 48 may be mounted at other locations within room 40, such as mounted only to the wall lower than the present location or mounted only to the ceiling located away from the walls. Additional air ducts may also be added so that a plurality of air ducts are present within the room. A livestock containment room with multiple air ducts is disclosed in U.S. Pat. No. 6,321,687 B1, filed Jul. 28, 2009 entitled INDIVIDUAL ROOM DUCT AND VENTILATION SYSTEM FOR LIVESTOCK PRODUCTION BUILDING, the disclosure of which is hereby incorporated by reference herein in its entirety.

3. System Control

Livestock production building 10 may include a control system to automatically monitor and control various systems throughout the building. For example, and as described in detail below, ventilation slides 120, exhaust fans 32, and conditioning of air temperature may all be automatically maintained at predetermined and/or optimal levels.

Referring to FIG. 2C, controller 74 controls exhaust fans 32 with input from pit temperature sensor 36 (FIG. 1), and controller 76 controls airflow through duct 48 with input from containment area temperature sensor 37 (FIG. 1). Other embodiments (not shown) monitor other environmental conditions within building 10, for example by using humidity sensors, methane sensors, sunlight sensors, and the like.

Controller 74 processes signal information from pit temperature sensor 36 to control, for example, exhaust fans 32, inlet fan 62, and heater 64. The operation of each of these devices may be changed to keep the exhaust temperature in a narrow range. For example, in warm weather controller 74 may regulate the volume of air exhausted by exhaust fans 32 to cool livestock production building 10. In cold weather, controller 74 may utilize inlet fan 62 to push air through heat exchanger 56 before the air is passed in to manifold area 26 (see below) and/or may provide an instruction to heater 64 to warm the fresh inlet air of livestock production building 10, as described below.

Controller 76 may operate similarly to controller 74, but controller 76 collects different data and may control a different set of systems. As noted above, the opening or closing of ventilation slides 120 is controlled by controller 76 acting on signal information received from room sensor 37. Thus, when room 40 is too warm, controller 76 opens ventilation slides 120 to allow more ventilation. Conversely, when room 40 is too cool, controller 76 closes ventilation slides 120 to reduce the ventilating air flowing from attic 20 through room 40.

Controller 76 may be programmable to operate with a temperature and time function, such that when the ambient temperature in containment area 22 as measured by sensor 37 rises or falls outside of a predetermined range, motor 127 actuates actuator rod 124 to open or close ventilation slides 120 as appropriate. For example, in a warm weather configuration, when a room reaches a temperature about a predetermined set point by a predetermined amount, such as by about 0.5 degrees F., controller 76 actuates actuator rod 124 to open ventilation slides 170, thereby allowing more ventilation air into containment room 140. Conversely, when the room temperature goes a certain amount below the set point, such as by about 0.5 degrees F., controller 76 moves actuator rod 124 in the opposite direction to close ventilation slides 120 and reduce the amount of ventilating air flowing through containment room 40. Controller 76 may also include a dwell or off time during which actuator 126 remains inactive after a period of activity. Thus, after opening ventilation slides 120 by a certain amount, slides 120 will not open further until the dwell time has elapsed. The dwell time functionality of controller 76 minimizes large temperature changes in containment room 40 by allowing the temperature to settle before making further temperature adjustments. In an exemplary embodiment, actuator rod 124 is a fiberglass rod, which advantageously experiences minimal thermal expansion or contraction for more precise control of ventilation slides 120.

Advantageously, ventilation slides 120 controlled by controller 76 allows for remote monitoring and management of the ventilation of containment area 22 in livestock production building 10. Atmospheric conditions, such as those recorded by sensors 36, 37 and the position and status of actuator 126 may be transmitted, such as via internet, wireless transmission or the like. This information may also be recorded by the receiving computer system for later analysis. Actuator 126 may also be controlled remotely via remote control of controller 76 and/or controller 74.

Controllers 74 and/or 76, or a separate controller (not shown) may be used to operate a cooling unit (not shown), such as an evaporative cooling unit as discussed above. In one embodiment, controllers 74, 76 would respond to time and temperature signals to deliver liquid to evaporative cooling pads, thereby cooling the air entering attic 20 via inlet vents 30 by an evaporative cooling effect. For example, controllers 74, 76 may be configured to flow water or cooling liquid over the evaporative cooling pads when the ambient temperature outside building 10 reaches or exceeds a certain level, such as 95 degrees Fahrenheit, and to continue wetting the pads until the ambient air temperature drops below a certain level, such as 94.5 degrees Fahrenheit. In addition, controllers 74, 76 may be configured to cease or prevent the flowing water over the evaporative cooling pads after a certain time of day, such as 10 pm, to avoid a nighttime chilling effect on the animals contained within containment area 22 of building 10. Controllers 74, 76 may then restart at a predetermined time of day the next morning, such as 10 am, provided the minimum ambient temperature is present as discussed above. Other embodiments may include other cooling systems, such as air conditioning systems. Other embodiments may also have other parameters for activation and/or deactivation, such as different temperatures, different times, certain time spans, building temperature and/or humidity, and the like.

Although controllers 74, 76 are described herein as controlling certain systems within building 10 in response to signals from sensors 36, 37 respectively, it is within the scope of the present disclosure that controllers 74, 76 may be linked or combined in to a common control system, and that the control system may operate any or all of the systems within building 10 in response to signals from any number of different sensors. Further, controllers 74, 76 are shown in a separate control room in livestock production building 10, but may be located elsewhere as long as controllers 74, 76 are operatively coupled to their respective sensors.

4. Heating/Cold Weather Building Operation

Livestock production building includes systems for operation and efficiency in colder climates or seasons. Although livestock contained in building 10 produce their own heat (and, thus, serve to heat containment rooms 40 to some extent), some minimal ventilation and fresh air is required for the health and safety of the livestock and workers.

Figure 10A:
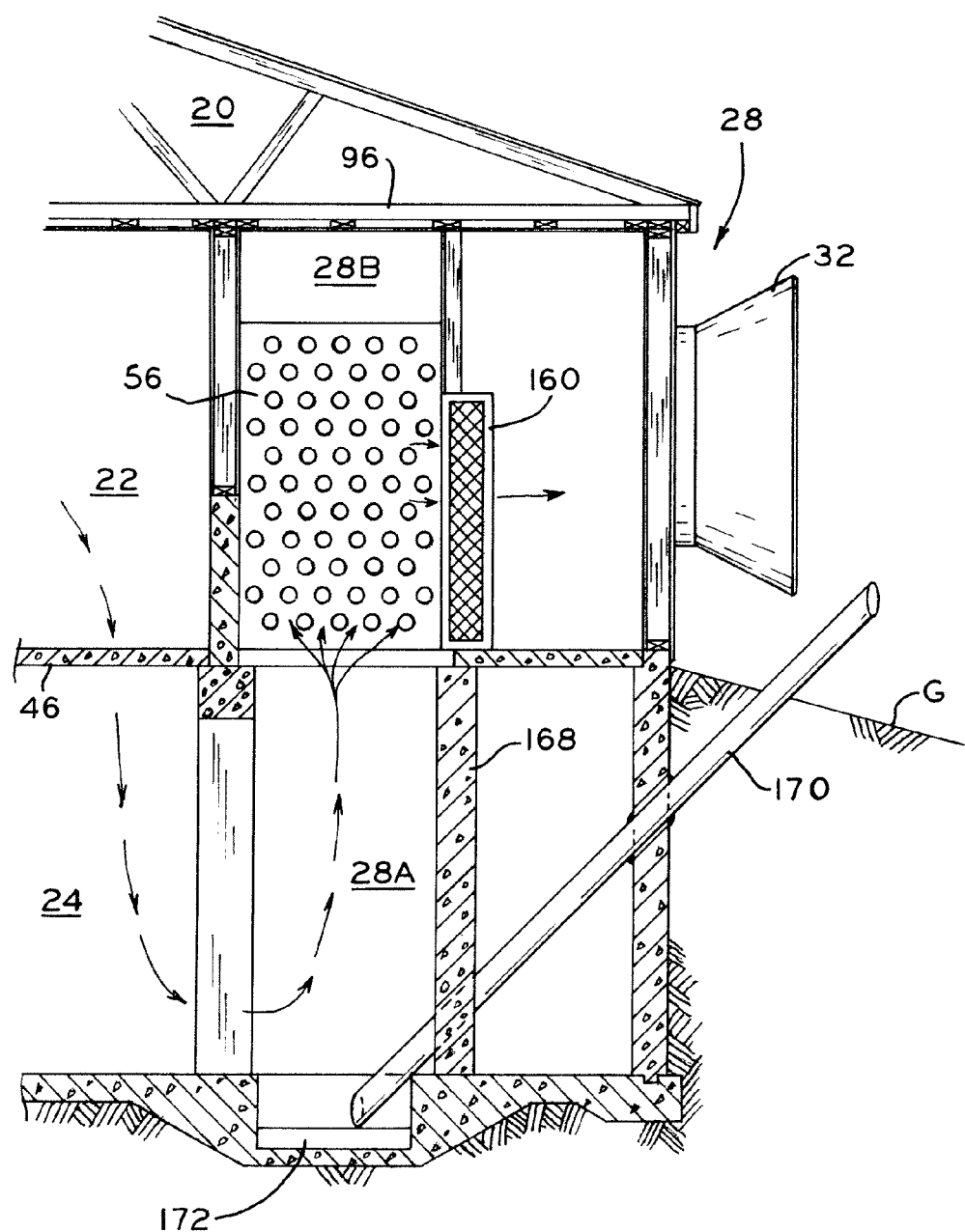
FIG. 10A is an elevation view of a ventilation house in accordance with the present disclosure, illustrating a vertically oriented filter and a heat exchanger.
Figure 11:
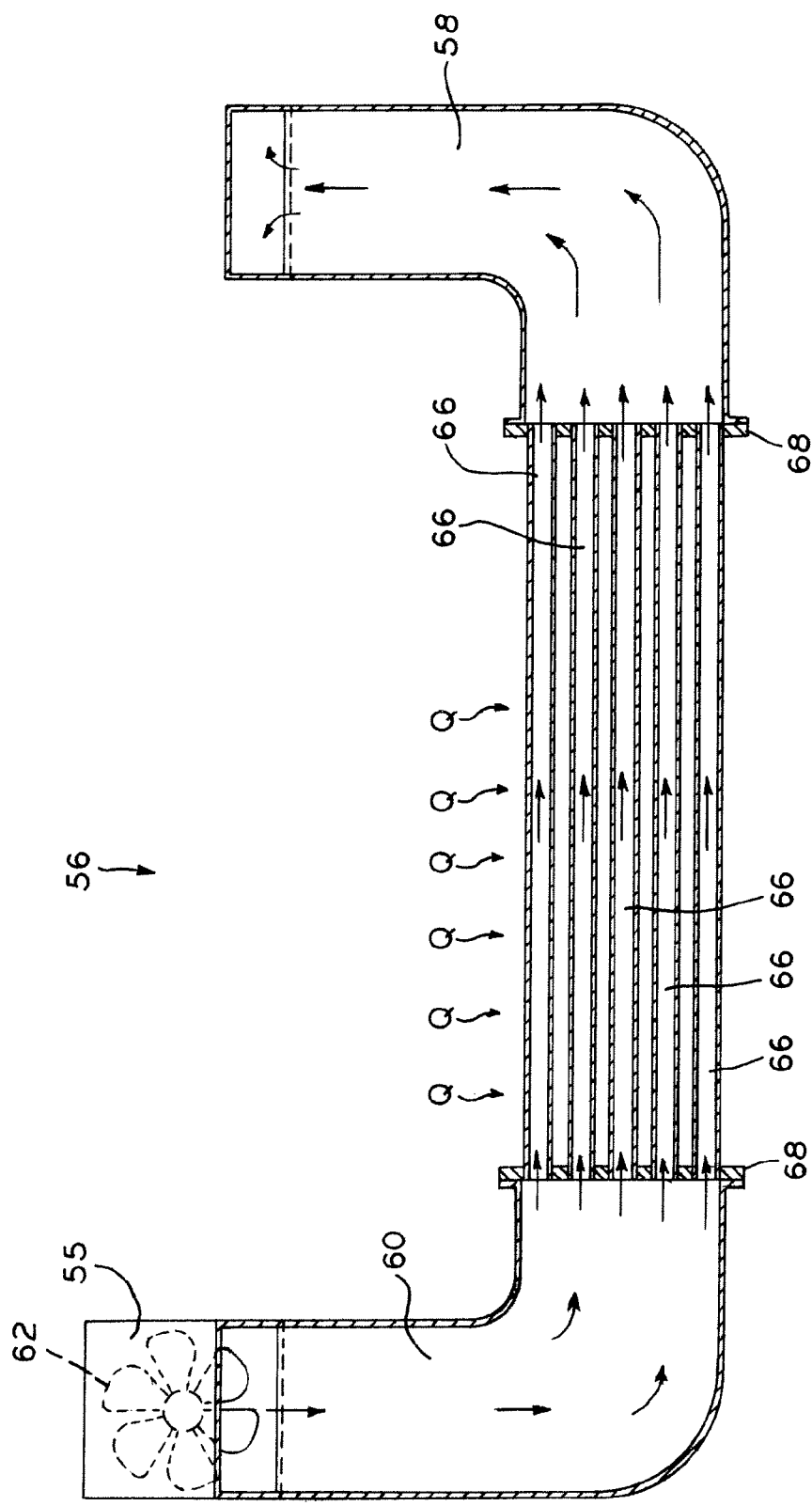
FIG. 11 is a sectional view of the heat exchanger along view lines 11-11 of FIG. 2D.

Referring to FIG. 11, air is drawn from attic 20 through intake duct 55 by inlet fan 62. Inlet fan 62 is located at an opening at the interior end of intake duct 55 and pushes air through intake duct 55 to an open bottom at the exterior end of intake duct 55. The air then flows into heat exchanger 56 located in ventilation house 28 (FIGS. 9B and 10A), where it is warmed by exhausting air, as described in detail below. The warmed fresh air then passes through a heat exchanger duct 58 and into attic duct 54. Attic duct 54 then directs the warmed fresh air into manifold area 26 where it is distributed to containment rooms 40 by lower air passage 50 of duct 48, as described above.

Figure 9A:
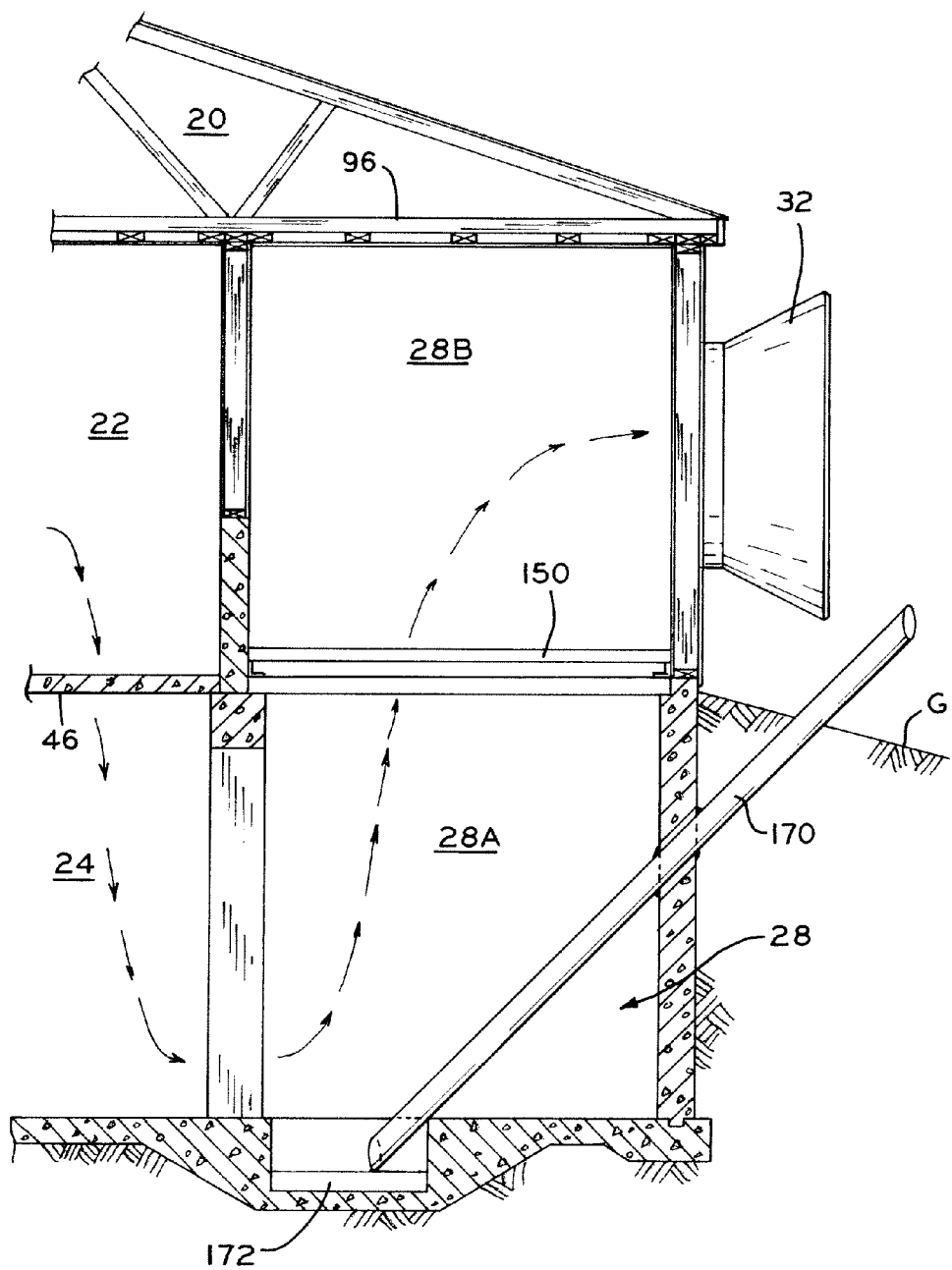
FIG. 9A is an elevation view of a ventilation house in accordance with the present disclosure, illustrating a horizontally oriented filter.
Figure 9B:
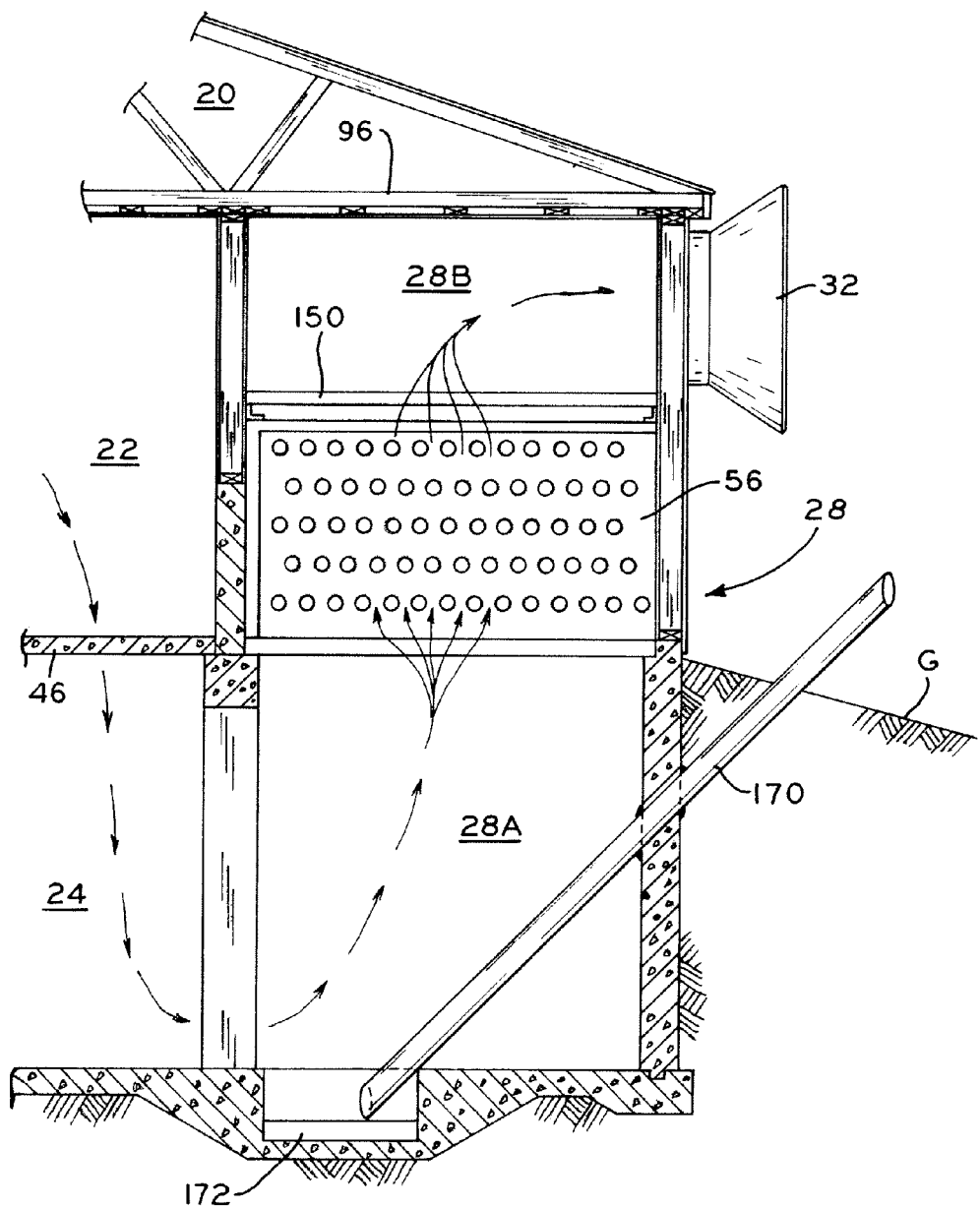
FIG. 9B is an elevation view of the ventilation house of FIG. 9A, illustrating a heat exchanger disposed below the filter.

Referring now to FIGS. 9B, 10A and 11, heat exchanger 56 includes inlet duct 60, inlet fan 62, a plurality of heat exchanger tubes 66, a plurality of heat exchanger brackets 68 and heat exchanger duct 58. The air flowing through tubes 66 is warmed by heat Q in the exhaust air from pit 24 traveling through ventilation house 28 and out through exhaust fan 32. In cold weather, inlet fan 62 pushes air through tubes 66 and into heat exchanger duct 58. The warmed air then travels into duct 54 and is deposited to manifold area 26 via aperture 57 in the lower surface of attic duct 54 (FIG. 2D).

Referring now to FIG. 5, manifold area 26 may further include heater 64. Heater 64 is used during cold weather to increase the temperature of the air in manifold area 26 prior to being distributed through air flow control valve 52 into containment room 40.

In accordance with another aspect of the present disclosure, manifold area 26 is used for the mixing/blending and tempering of the incoming air to a uniform temperature. Manifold area 26 receives air from attic 20 and/or attic duct 54. In cold weather, heater 64 may be used to supplement heating from heat exchanger 56. The air in manifold area 26 is then pulled into containment rooms 40 through airflow control valve 52 and distributed over the livestock via air ducts 48. One advantage of manifold area 26 is that it is a better and more controllable area to blend the air than attic 20, especially when adding heat with heat exchanger 56 or heater 64. Manifold area 26 is insulated from the outside by containment rooms 40, attic 20 and pit 24. The ease of controlling air flow control valve 52 in manifold area 26 is another advantage.

Also advantageously, ventilation slides 120 may be closed completely during cold weather, so that no air passes in to containment rooms 40 that has not been warmed and/or tempered. Thus, lower air passage 50 provides sufficient minimal ventilation of air that has been heated by heat exchanger 56 and/or heater 64 and tempered in manifold area 26.

The air flow pattern in livestock production building 10 may be changed to accommodate cold weather. Referring to FIG. 11, Warmed exhaust air is pulled through heat exchanger 56 by exhaust fans 32 and warms heat exchanger 56. Cool air drawn through tubes 66 of heat exchanger 56 is warmed by the exhaust air via convection through the walls of tubes 66. This cool air is pushed into heat exchanger 56 through inlet duct 60 by inlet fan 62 of intake duct 55. Referring now to FIG. 2D, upon passing through heat exchanger 56, the warmed air flows through heat exchanger duct 58, into attic duct 54, and finally into manifold area 26 via aperture 57. The air is then distributed to containment rooms 40 and pulled down over the animals through slatted floor 46 into pit 24 and out through ventilation house 28 through heat exchanger 56, once again warming the air in heat exchanger 56. The air then exits building 10 through exhaust fan 32. In this manner, some of the exhausted heat is recovered and used to warm the incoming air.

5. Filtering of Incoming and Exhaust Air

Livestock production building 10 may include filtering systems. For example, filtering of incoming air may be performed to prevent introduction of pathogens or other airborne environmental hazards from the ambient air outside building 10 to the fresh air entering rooms 40. Filtering of exhaust air may be performed to limit the environmental impact of the livestock production, such as odor, airborne particulate matter, etc.

Figure 1C:
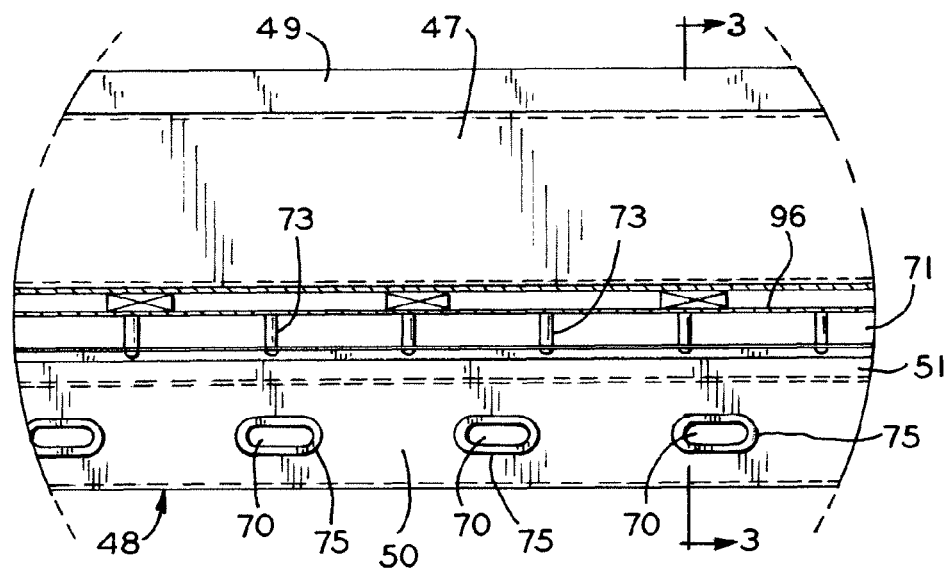
FIG. 1C is a enlarged, partial view of the building of FIG. 1B, illustrating the air duct.

Referring to FIGS. 1B, 1C and 2C, air duct 48 may include filter element 49 disposed between attic 20 and containment area 22. Filter 49 is placed over filter duct 47, which in turn is placed over one or more apertures 98 so that air passing from attic 20 into containment area 22 must pass through filter 49. Thus, air passing from attic 20 to containment rooms 40 via upper passage 51 of duct 48 is filtered prior to coming in to contact with the livestock in rooms 40. In an exemplary embodiment, filter 49 is a HEPA type filter.

Figure 8:
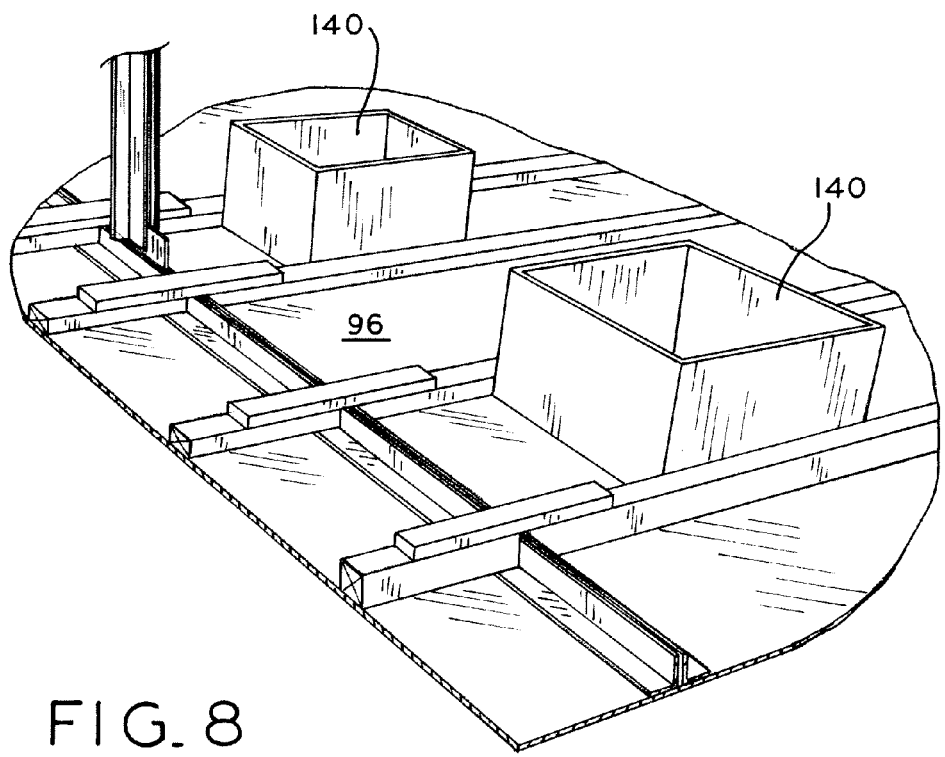
FIG. 8 is a perspective view of an attic of a livestock production building in accordance with the present disclosure, illustrating insulation stops.

Referring now to FIG. 8, insulation stops 140 may be included above manifold area 26 in ceiling 96. Insulation stops 140 prevent insulation in ceiling 96 from blocking aperture 98, and may also contain additional filter elements, such as HEPA type filters, to filter air passing directly between attic 20 and manifold area 26 (as shown in FIG. 1).

A heat exchanger filtering element (not shown) may be placed in intake duct 55 proximal inlet fan 62. When air is drawn in to intake duct 55 by fan 62, it is filtered before entering heat exchanger 56. Thus, the air entering manifold area 26 via attic duct 54 (as discussed above) is filtered.

Optionally, an ambient air filtering element (not shown) may also be placed between inlet vents 30 and the ambient outside air. Thus, and air entering attic 20 is pre-filtered before undergoing any further filtering stages as described herein.

Moreover, substantially all of the air entering containment area may be filtered through one or more of the filtering elements mentioned above, providing a clean-air environment for the livestock contained therein. Advantageously, this protects the livestock from disease and helps to ensure a healthy population.

Referring now to FIGS. 9A-10B, livestock production building 10 may include filtering systems that filter substantially all of the exhausted air through ventilation house 28. In one embodiment, shown in FIGS. 9A-9C, air passes from containment area 22 down into pit 24 and then into ventilation house 28 via pit opening 34. Exhaust fan 32 pulls air from a lower portion 28A of ventilation house 28 to an upper portion 28D through a horizontally disposed filter 150. Ventilation house 28 runs substantially the entire length of livestock production building 10, and therefore horizontal filter 150 may have sufficient surface area to filter all or substantially all of the exhaust air passing through exhaust fan 32. Ventilation house 28 may also include a pump tube 170 extending from a trough 172 in lower portion 28A to above grade G. Pump tube may be used to remove solid or liquid waste matter from pit 24 and/or lower portion 28A.

Referring now to FIG. 9C, a plan view of ventilation house 28 shows intermittent solid poured concrete floor sections 152 with a plurality of concrete slats 154 therebetween. These structures provide sufficient support for horizontal filter 150 while allowing air to pass freely from lower portion 28A to upper portion 28B of ventilation house 28 via openings 156 between slats 154. As also shown in FIG. 9C, exhaust fans 32 may have a variety of sizes to accommodate different exhaust air flows as needed or desired.

Referring now to FIGS. 10A and 10B, exhaust air may also be filtered with a generally vertically disposed filtering element 160. In this configuration, filter 160 and heat exchanger 56 are both located in upper portion 28B of ventilation house 28. Air passes from containment area 22 and down into pit 24 before passing into lower ventilation area 28A. Air is prevented from flowing into an exterior portion of upper ventilation house area 28B by a continuous solid floor section 162 (FIG. 10B). Thus, air is drawn through vertical filter element 160 via openings 166 between slats 164. In order to accommodate the increased concentration of weight on the floor between lower ventilation area 28A and upper ventilation area 28B, a plurality of support columns 168 are provided underneath vertical filter 160 at various positions throughout ventilation house 28.

Advantageously, because ventilation house 28 runs substantially the entire length of livestock production building 10, horizontal filter 150 or vertical filter 160 may also span substantially the entire length of livestock production building 10. Thus, substantially all of air being exhausted through exhaust fans 32 may be filtered by one of filters 150, 160. Thus, livestock production building 10 has a reduced impact on the environment and is better able to comply with environmental regulations.

While this invention has been described as having different embodiments, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A building comprising:
   at least one containment area;
   a ventilation duct located at a ceiling of said containment area and defining an air passage running along a duct length, said ventilation duct including at least one of an opening and a gap positioned to permit fluid communication from said air passage to said containment area;
   an exhaust fan interposed between the containment area and ambient air outside the containment area, said exhaust fan oriented to create a relatively lower air pressure within the containment area as compared to a relatively higher air pressure within said air passage of said ventilation duct,
   said exhaust fan positioned to receive a flow of air drawn from the ambient air outside the containment area into the containment area via an exhaust opening, said exhaust opening interposed between said exhaust fan and said ventilation duct and positioned below said ventilation duct such that said flow of air is drawn downwardly from said ventilation duct and through the containment area and exhausted externally of the containment area, whereby upward airflow of said flow of air between said exhaust opening and said ventilation duct is substantially avoided within the containment area.

2. The building of claim 1, further comprising an attic having a fresh air intake and a vent, said fresh air intake in fluid communication with ambient air outside the containment area such that said relatively lower pressure within the containment area draws said flow of air into said attic through said fresh air intake.

3. The building of claim 2, wherein said ventilation duct is coupled to said vent of said attic such that said ventilation duct is in fluid communication with said attic via said vent.

4. The building of claim 3, wherein said containment area comprises a manifold area in fluid communication with said air passage of said ventilation duct,
   a portion of said flow of air passing from said attic into said containment area via said manifold area, such that said manifold area mixes and tempers the portion of said flow of air to a uniform temperature, and a portion of said flow of air passing directly from said attic into said containment area through said air passage of said ventilation duct, and into said containment area.

5. The building of claim 4, wherein the portion of said flow of air passing from said attic into said containment area via said manifold area provides a baseline air flow to said containment area.

6. The building of claim 5, wherein the portion of said flow of air passing from said attic into said containment area via said manifold area provides a higher air flow to said containment area in addition to the baseline air flow.

7. The building of claim 6, wherein said ventilation duct comprises a first duct having a first air passage in fluid communication with said manifold area and a second duct having a second air passage in fluid communication with said attic.

8. The building of claim 7, wherein said first duct defines a first duct length, said first duct comprising a plurality of openings distributed along said first duct length and sized to provide the baseline air flow to the containment area.

9. The building of claim 8, wherein said plurality of openings are evenly distributed along said first duct length.

10. The building of claim 7, wherein said second duct defines a second duct length, said second duct comprising a plurality of spacers extending upwardly therefrom, said spacers connected to the ceiling of the containment area to form a gap between said second duct and the ceiling, said gap extending along said second duct length.

11. The building of claim 10, wherein said second duct further comprises a plurality of ventilation slides disposed within said second duct and distributed along said second duct length, said ventilation slides interposed between the ambient air and the containment area, said ventilation slides positionable in at least one open position in which said ventilation slides permit movement of air between the ambient air and the containment area via the ventilation duct, and a closed position in which said ventilation slides impede movement of air between the fresh air supply and the containment area via the ventilation duct.

12. The building of claim 11, wherein at least one of said ventilation slides comprises an actuator coupled to each of said ventilation slides, such that said ventilation slides are movable between said open position and said closed position by actuation of said actuator.

13. The building of claim 12, further comprising a control system comprising:

a sensor positioned proximate the containment area with an output signal relating to an ambient condition proximate said sensor;

a controller including a comparator comparing said output signal to a value, said controller actuating said actuator when said comparator is in a predetermined state, said controller having an upper temperature limit and a lower temperature limit, said comparator comparing said upper temperature limit and said lower temperature limit with said output signal, and said predetermined state being when an ambient temperature is one of i) lower than the lower temperature limit and ii) higher than the upper temperature limit.

14. The building of claim 13, wherein said controller controls said exhaust fan to regulate an amount of the ambient air drawn downwardly through the containment area.

15. The building of claim 7, wherein said first duct defines a first duct length and said second duct defines a second duct length, said first and second duct lengths sized to run an entire length of the containment area.

16. The building of claim 15, wherein said first duct and said second duct are centrally located at the ceiling of the containment area.

17. A building for providing air distribution from a fresh air supply to a containment area, the building comprising:

an upper duct defining an upper duct length fixed at a ceiling of the containment area, said upper duct having a plurality of spacers extending upwardly therefrom, said spacers sized and positioned to connect to the ceiling to form a gap between said upper duct and the ceiling, said upper duct further comprising a plurality of ventilation slides distributed along said upper duct length between the fresh air supply and the containment area;

a lower duct defining a lower duct length fixed to said upper duct, said lower duct having a plurality of openings sized to provide a baseline flow of air to the containment area, said plurality of openings distributed along said lower duct length;

an actuator coupled to said plurality of ventilation slides, said actuator moveable between a closed position in which said ventilation slides impede movement of air between the fresh air supply and the containment area via said gap in said upper duct, and at least one open position in which said ventilation slides permit movement of air between the fresh air supply and the containment area via said gap in said upper duct; and an exhaust fan interposed between the containment area and ambient air outside the containment area, said exhaust fan oriented to create a relatively lower air pressure within the containment area as compared to a relatively higher air pressure within said upper duct and said lower duct, said exhaust fan positioned to receive a flow of air from the containment area via an exhaust opening interposed between said exhaust fan and said upper and lower ducts, said exhaust opening positioned below said upper duct and said lower duct, such that said fresh air supply is drawn downwardly within the containment area and exhausted externally of the containment area, whereby upward airflow is substantially avoided between the containment area and said upper duct and lower ducts.

18. The building of claim 17, wherein said lower duct further comprises an end door selectively interposed between the fresh air supply and said plurality of openings of said lower duct, such that said lower duct provides the baseline flow of air to the containment area via said plurality of openings when said end door is in an open position.

19. The building of claim 17, further comprising a control system comprising:

a sensor positioned proximate the containment area with an output signal relating to an ambient condition proximate said sensor;

a controller including a comparator comparing said output signal to a value, said controller actuating said actuator when said comparator is in a predetermined state, said controller having an upper temperature limit and a lower temperature limit, said comparator comparing said upper temperature limit and said lower temperature limit with said output signal, and said predetermined state being when an ambient temperature is one of i) lower than the lower temperature limit and ii) higher than the upper temperature limit.

20. The building of claim 19, wherein said controller controls said exhaust fan to regulate an amount of fresh air supply drawn downwardly within the containment area.

21. The building of claim 17, wherein said upper and lower duct lengths are sized to run an entire length of the containment area.

22. The duct system of claim 17, wherein said upper duct and said lower duct are centrally located at the ceiling of the containment area such that air is evenly distributed over the containment area.

23. A building comprising:
- a containment room having a ceiling;
- a ventilation house in fluid communication with said containment room, said ventilation house comprising an exhaust fan disposed between said containment room and ambient air outside the building and operable to create a relatively low pressure in said building compared to the ambient air outside the building;
- an attic above said containment room, said attic comprising:
  - a fresh air intake in fluid communication with the ambient air outside the building such that said relatively low pressure in said building draws the ambient air into said attic through said fresh air intake; and
  - a vent; and
- a ventilation duct coupled to said vent and in fluid communication with said attic and said containment room, such that after said ambient air has been drawn into said attic though said fresh air intake, said ambient air passes from said attic into said containment room through said ventilation duct, said ventilation duct located at one of a location on said ceiling and a location spaced away from said ceiling such that ambient air flows downwardly from said ventilation duct into said containment room, and then from said containment room into said ventilation house, and is then exhausted from said ventilation house by said exhaust fan.

24. The building of claim 23, wherein said containment room comprises a plurality of compartments.

25. The building of claim 23, further comprising a cooling unit disposed between the ambient air and said fresh air intake, said cooling unit operable to cool said production building.

26. The building of claim 23, further comprising a heat exchanger operable to exchange heat from warmed exhaust air to cool incoming air, such that the cool incoming air is warmed before being distributed into said containment room.

27. The building of claim 26, wherein said heat exchanger is located in said ventilation house.

28. The building of claim 23, wherein said ventilation duct comprises a first duct and a second duct, said first and second ducts sized to run an entire length of the containment room.

29. The building of claim 23, wherein said ventilation house is coupled to a wall of the building.

* * * * *